United States Patent
Hayashi (10) Patent No.: US 10,094,739 B2
(45) Date of Patent: *Oct. 9, 2018

(54) LIGHT-EMITTING APPARATUS AND METHOD FOR CHECKING LIGHT-EMITTING APPARATUS

(71) Applicant: PANASONIC INTELLECTUAL PROPERTY MANAGEMENT CO., LTD., Osaka (JP)

(72) Inventor: Shintaro Hayashi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/658,589

(22) Filed: Jul. 25, 2017

(65) Prior Publication Data

US 2018/0031444 A1 Feb. 1, 2018

(30) Foreign Application Priority Data

Jul. 28, 2016 (JP) .................. 2016-148888

(51) Int. Cl.
*G01J 1/00* (2006.01)
*G01M 11/00* (2006.01)
*F21V 8/00* (2006.01)

(52) U.S. Cl.
CPC ............ *G01M 11/33* (2013.01); *G02B 6/001* (2013.01)

(58) Field of Classification Search
CPC .... G01J 1/4257; G01J 1/42; G01J 1/02; G01J 2001/4247; G01J 1/04

USPC ........................................... 356/213
See application file for complete search history.

(56) References Cited

U.S. PATENT DOCUMENTS

| | | | | |
|---|---|---|---|---|
| 5,800,184 A | * | 9/1998 | Lopergolo | H05K 7/1069 439/591 |
| 6,292,003 B1 | * | 9/2001 | Fredrickson | G01R 1/0483 324/750.25 |
| 6,710,798 B1 | * | 3/2004 | Hershel | G01R 31/2887 324/750.23 |
| 8,078,256 B2 | * | 12/2011 | Zan | A61B 8/0833 219/218 |
| 9,684,052 B2 | * | 6/2017 | Olmstead | G01R 35/00 |

(Continued)

FOREIGN PATENT DOCUMENTS

| | | |
|---|---|---|
| JP | 5-27121 | 2/1993 |
| JP | 2006-3598 | 1/2006 |
| JP | 2011-185816 | 9/2011 |

*Primary Examiner* — Md M Rahman
(74) *Attorney, Agent, or Firm* — Greenblum & Bernstein, P.L.C.

(57) ABSTRACT

A light-emitting apparatus includes: a radiation apparatus which includes a first laser diode and a second laser diode; a light guide which includes a first photoreceptor, a second photoreceptor, and a leak, and guides laser light received by the first photoreceptor and the second photoreceptor, the leak allowing leakage laser light to be leaked out in a direction crossing a light-guiding direction, the leakage laser light being part of the laser light; a converter which converts a wavelength of the leakage laser light leaked out of the light guide; and a detector which detects, at a non-radiation time in which laser light is not radiated, an electromotive force of the first laser diode, the electromotive force being based on laser light radiated by the second laser diode.

5 Claims, 7 Drawing Sheets

(56) References Cited

U.S. PATENT DOCUMENTS

| | | | |
|---|---|---|---|
| 2007/0053043 A1* | 3/2007 | Wada | B41J 2/473 359/216.1 |
| 2007/0096763 A1* | 5/2007 | Ehrmann | G01R 31/2891 324/750.23 |
| 2008/0197865 A1* | 8/2008 | Endres | G01R 31/2886 324/754.07 |
| 2009/0290902 A1* | 11/2009 | Amico | G03G 15/5016 399/107 |
| 2010/0176831 A1* | 7/2010 | Palcisko | G01R 1/07378 324/756.03 |
| 2011/0267087 A1* | 11/2011 | Huang | G01R 31/2635 324/754.23 |
| 2013/0207550 A1* | 8/2013 | Nishio | G05D 25/02 315/151 |
| 2014/0092716 A1* | 4/2014 | Saito | B82Y 35/00 369/53.38 |
| 2015/0177313 A1* | 6/2015 | Hoelter | G02B 27/0977 324/754.21 |
| 2016/0265747 A1* | 9/2016 | Nagao | A61B 1/0684 |
| 2017/0031516 A1* | 2/2017 | Sugiyama | G06F 3/0416 |
| 2017/0179682 A1* | 6/2017 | Ishii | H01S 5/0262 |
| 2017/0199271 A1* | 7/2017 | Nihei | G01S 7/4808 |
| 2017/0235059 A1* | 8/2017 | Anderson | G02B 6/3696 385/126 |
| 2017/0259763 A1* | 9/2017 | Chassard | B60R 16/0231 |
| 2017/0293067 A1* | 10/2017 | Watanabe | G02B 6/0033 |
| 2017/0293812 A1* | 10/2017 | Itoh | G01N 21/21 |

* cited by examiner

LIGHT-EMITTING APPARATUS AND METHOD FOR CHECKING LIGHT-EMITTING APPARATUS

CROSS REFERENCE TO RELATED APPLICATION

This application claims the benefit of priority of Japanese Patent Application Number 2018-148888 filed on Jul. 28, 2016, the entire content of which is hereby incorporated by reference.

BACKGROUND

1. Technical Field

The present disclosure relates to a light-emitting apparatus which linearly emits light using laser light as a light source, and a method for checking the light-emitting apparatus.

2. Description of the Related Art

Conventionally, there has been a light-emitting apparatus which includes a leak that allows part of light guided into a light guide such as an optical fiber to be leaked out, and which causes a phosphor around the light guide to linearly emit visible light based on the leaked light.

For example, Patent Literature (PTL) 1 (Japanese Unexamined Patent Application Publication No. H5-27121) and Patent Literature (PTL) 2 (Japanese Unexamined Patent Application Publication No. 2006-3598) disclose a technique for meanderingly or circularly placing a light guide of a light-emitting apparatus in a plane for surface emission.

SUMMARY

When a light guide included in such a light-emitting apparatus is broken, laser light is radiated in an unexpected direction from the light guide, which is likely to have a negative influence on the human eye. In addition, when the light guide is forcibly bent, a bending loss of laser light to be guided is caused, and an amount of light generated is reduced. Effective measures for detecting a break in or forcible bending of a light guide, however, are not yet in existence.

The present disclosure has an object to provide a light-emitting apparatus which linearly emits light using a light guide and detects a break in the light guide or the like, and a method for checking the light-emitting apparatus.

A light-emitting apparatus according to one aspect of the present disclosure includes: a radiation apparatus including a laser diode; a light guide which includes a first photoreceptor at one end, a second photoreceptor at another end, and a leak, the light guide guiding laser light radiated by the radiation apparatus and received by the first photoreceptor and the second photoreceptor, the leak allowing leakage laser light to be leaked out in a direction crossing a light-guiding direction, the leakage laser light being part of the laser light; a converter which is disposed along the light guide and converts a wavelength of the leakage laser light leaked out of the light guide; and a detector which detects, at a non-radiation time in which the laser diode does not radiate laser light, an electromotive force of the laser diode and informs status information about a status of the light guide, the electromotive force being based on the laser light radiated by the laser diode.

Moreover, a method for checking a light-emitting apparatus according to another aspect of the present disclosure is a method for checking a light-emitting apparatus which includes: a radiation apparatus including a laser diode; a light guide which, includes a first photoreceptor at one end, a second photoreceptor at another end, and a leak, the light guide guiding laser light radiated by the radiation apparatus and received by the first photoreceptor and the second photoreceptor, the leak allowing leakage laser light to be leaked out in a direction crossing a light-guiding direction, the leakage laser light being part of the laser light; a converter which is disposed along the light guide and converts a wavelength of the leakage laser light leaked out of the light guide; and a detector which detects, at a non-radiation time in which the laser diode does not radiate laser light, an electromotive force of the laser diode and informs status information about a status of the light guide, the electromotive force being based on the laser light radiated by the laser diode, the method including: oscillating laser light weaker than a rated output of the laser diode before the light-emitting apparatus emits light by causing the laser diode to oscillate laser light at the rated output; and informing an abnormality of the light guide when the detector determines that the electromotive force of the laser diode is less than or equal to a first threshold.

According to the present disclosure, when linear light is emitted using a light guide, it is possible to detect a break in the light guide, forcible bending of the light guide, or the like, and inform the status of the light guide.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Hereinafter, a light-emitting apparatus according to an embodiment of the present disclosure will be described with reference to the drawings. It is to be noted that embodiments and variations to be described below each show a specific example of the present disclosure. The numerical values, shapes, materials, structural elements, the arrangement and connection of the structural elements, etc. indicated in the following embodiments and variations are mere examples, and therefore do not intend to limit the present disclosure. Furthermore, among the structural elements in the following embodiments and variations, structural elements not recited in any of the independent claims which indicate the broadest concept of the present disclosure are described as optional structural elements.

It is also to be noted that the figures are schematic diagrams and are not necessarily precise illustrations. Additionally, the same structural elements are assigned the same reference signs in the figures, and descriptions thereof may be omitted.

[Configuration of Light Emitting Apparatus]

Figure 1:
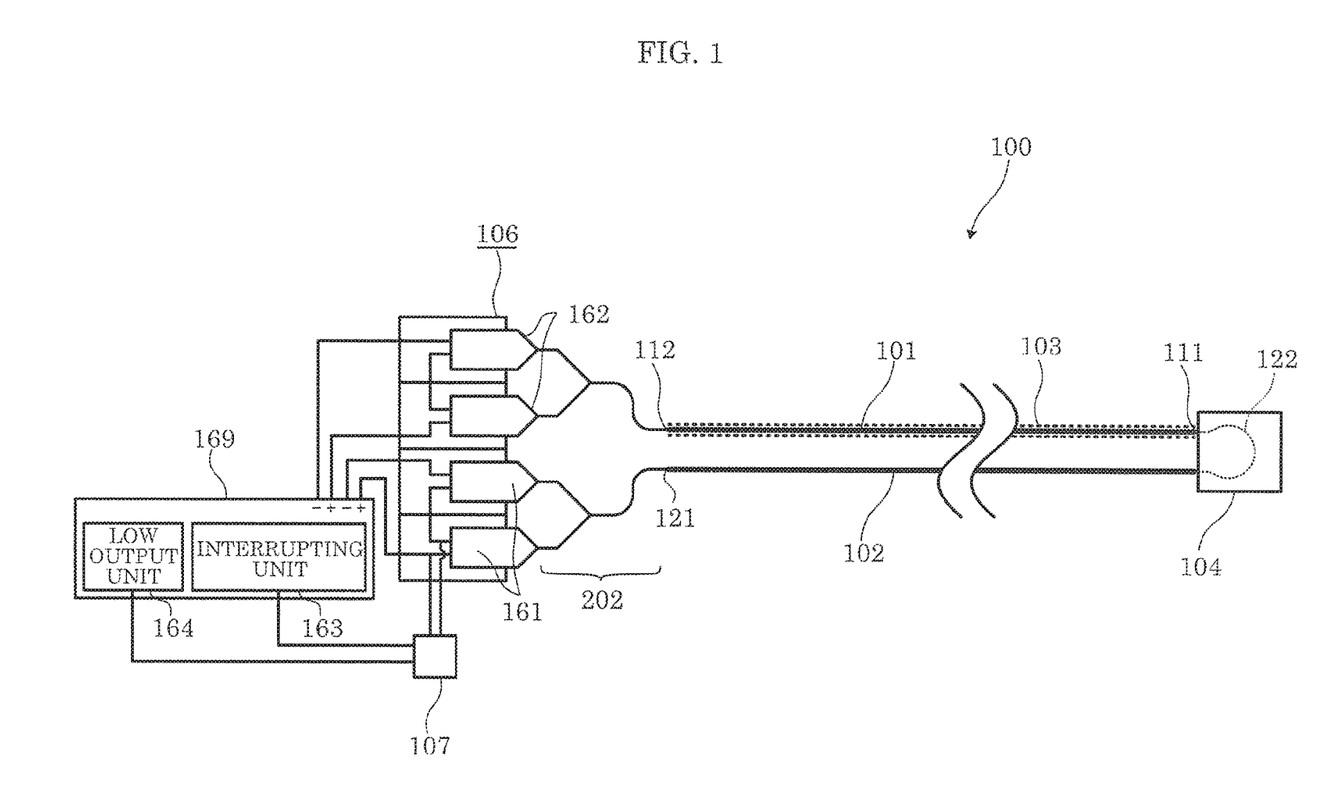
FIG. 1 is a diagram illustrating the configuration of a light-emitting apparatus according to an embodiment.

FIG. 1 is a diagram illustrating the configuration of a light-emitting apparatus according to an embodiment.

As illustrated in the figure, light-emitting apparatus 100 according to the present embodiment illuminates a predetermined space in, for example, a building, a mobile body, an outdoor place, or the like, is used as an indicator lamp, a neon sign, or the like, and includes radiation apparatus 106, light guide 101, converter 103, and detector 107.

[Radiation Apparatus 106]

Radiation apparatus 106 includes a laser diode which radiates laser light to converter 103. The laser diode included in radiation apparatus 106 radiates laser light of a short wavelength selected from a blue-violet to blue (430 nm to 490 nm) range such that converter 103 radiates visible light of a long wavelength. In the present embodiment, radiation apparatus 106 includes: first laser diode 161 which oscillates to radiate laser light to first photoreceptor 111; and second laser diode 162 which radiates laser light to second photoreceptor 112. It is to be noted that although radiation apparatus 106 includes laser diodes which oscillate to radiate laser light to first photoreceptor 111 in the present embodiment, the laser diodes are collectively referred to as first laser diode 161, and laser diodes which radiate laser light to second photoreceptor 112 are referred to as second laser diode 162.

The laser diodes included in first laser diode 161 and the laser diodes included in second laser diode 162 are connected in series with power supply 169 included in radiation apparatus 106. The laser diodes included in radiation apparatus 106 are collectively disposed in one housing. In addition, radiation apparatus 106 includes waveguide body 202 which is capable of integrating beams of laser light radiated by the laser diodes into a beam of laser light.

[Power Supply 169]

Power supply 169 supplies power for causing the laser diodes included in each of first laser diode 161 and second laser diode 162 to oscillate laser light. In the present embodiment, power supply 169 is a direct-current power supply and capable of applying a predetermined voltage to all laser diodes connected in series. In addition, power supply 169 is capable of causing first laser diode 161 and second laser diode 162 to alternately oscillate laser at a predetermined frequency.

In the present embodiment, power supply 169 further includes, as a controller, interrupting unit 163 and low output unit 164.

Interrupting unit 163 interrupts the laser oscillation by first laser diode 161 and second laser diode 162, based on status information informed by detector 107. It is to be noted that specific interruption conditions will be described later.

Low output unit 164 causes second laser diode 162 to oscillate laser light at an output lower than the rated output of second laser diode 162. In addition, low output unit 164 is capable of transmitting, to detector 107, low output oscillation information indicating that second laser diode 162 is caused to oscillate laser light at a low output.

[Light Guide 101]

Figure 2:
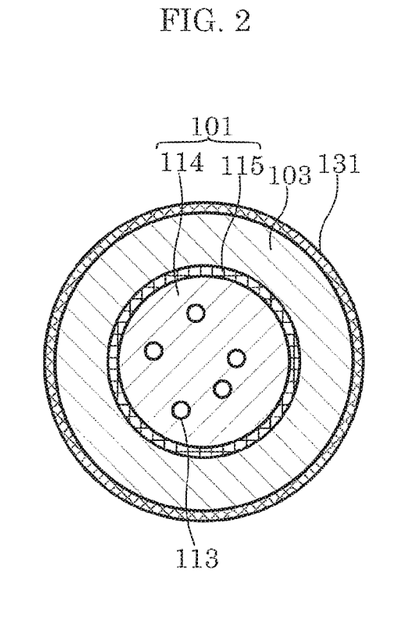
FIG. 2 is a cross-sectional view illustrating a cross section of a light guide and a converter when cut perpendicular to a light-guiding direction of laser light.

FIG. 2 is a cross-sectional view illustrating a cross section of a light guide and a converter when cut perpendicular to a light-guiding direction of laser light.

Figure 3:
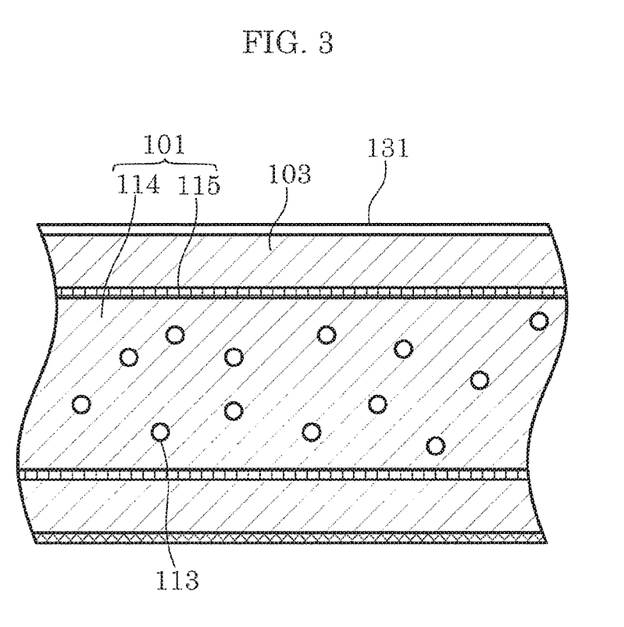
FIG. 3 is a cross-sectional view illustrating a cross section of the light guide and the converter when cut along the light-guiding direction of laser light.

FIG. 3 is a cross-sectional view illustrating a cross section of the light guide and the converter when cut along the light-guiding direction of laser light.

Light guide 101 is capable of guiding laser light radiated by radiation apparatus 106 along a linear path, and includes first photoreceptor 111 at one end and second photoreceptor 112 at another end. In addition, light guide 101 guides received laser light and includes leak 113 which allows part of the guided laser light to be leaked out in a direction crossing a light-guiding direction.

In the present embodiment, light guide 101 is what is called an optical fiber which is flexible (has flexibility), and includes core 114 and cladding 115. A higher refractive index is set for core 114 than for cladding 115, which allows light guide 101 to keep laser light inside core 114 by total reflection, and guide the laser light highly efficiently. Core 114 and cladding 115 are made from a material which is highly transmissive of laser light, such as quartz glass and a plastic material like an acryl resin.

[Leak 113]

Leak 113 is a component or structure which allows part of laser light guided by light guide 101 and passing inside core 114 to be leaked out in a direction crossing the light-guiding direction.

In the present embodiment, leak 13 includes minute beads dispersed inside core 114. The beads have a surface which scatters laser light, and part of the laser light scattered by leak 113 travels in a direction different from the light-guiding direction, and passes through cladding 115 to leak out of light guide 101.

It is to be noted that leak 113 is not limited to the beads dispersed inside core 114, and may be another component or structure. For example, leak 113 may be cavities (air bubbles) dispersed inside core 114. In addition, leak 113 may be a portion provided in part of cladding 115 and having a refractive index different from that of cladding 115 to avoid total reflection of laser light passing inside core 114.

[Converter 103]

Converter 103 is disposed along light guide 101 and converts a wavelength of laser light which leak 113 allows to be leaked out of light guide 101 in a direction crossing the light-guiding direction. In the present embodiment, converter 103 is what is called a remote phosphor including dispersed phosphor particles which emit fluorescence when excited by laser light leaked out of light guide 101. Specifically, converter 103 can be exemplified as a component in which phosphor particles are dispersed inside a transparent base material. Moreover, a base material of converter 103 is made of resin etc. which is transparent to laser light and light radiated by phosphors, and bends following a change in the form of light guide 101.

Although it is sufficient that converter 103 includes at least one type of phosphor, in the present embodiment, converter 103 includes multiple types of phosphors. More specifically, in order to radiate light of a desired color such as white light using, as excitation light, laser light of a short wavelength received from radiation apparatus 106, converter 103 includes, in an appropriate ratio, multiple types of phosphors which emit beams of light of a wavelength longer than that of the laser light and of colors such as red, yellow, and green. As stated above, the beams of light having the desired colors can be radiated by the mixing of the beams of light of different wavelengths radiated by the multiple types of the phosphors excited by the laser light of the short wavelength. Here, the term "ratio" includes a ratio in which at least one number is 0.

Although a method for disposing converter 103 along light guide 101 is not particularly limited, for example, converter 103 may be attached to light guide 101 by applying a liquid base material (resin) containing phosphors onto the outer circumferential surface of light guide 101, or converter 103 having a sheet shape or cylindrical shape may be laminated onto light guide 101.

It is to be noted that phosphors may be included in cladding 115 of light, guide 101, and caused to serve as converter 103 and leak 113.

It is to be noted that at least one of the concentration of phosphor and the ratio among the multiple types of the phosphors may be gradually or continuously varied along light guide 101.

Moreover, converter 103 may include a function film for efficiently irradiating the phosphors with laser light, a function film for efficiently radiating emitted visible light, or the like.

Furthermore, converter 103 may include cover 131 which protects converter 103 from scrapes and scratches. Although a method for forming cover 131 or disposing cover 131 around converter 103 is not particularly limited, a thin flexible resin tube may be disposed in close adhesion around converter 103. Moreover, cover 131 may be formed by applying a liquid resin onto converter 103 and hardening the resin using ultraviolet radiation, heat, etc.

It is to be noted that cover 131 may include a scattering component or structure which scatters laser light to reduce the coherence of laser light leaked out of light guide 101 and converter 103.

[Sub-Light Guide 102]

In the present embodiment, light-emitting apparatus 100 includes sub-light guide 102 for guiding light oscillated by first laser diode 161 to first photoreceptor 111. Sub-light guide 102 is capable of guiding laser light radiated by radiation apparatus 106 along a linear path in the same manner as light guide 101, includes third photoreceptor 121 which receives laser light, at an end on the side of radiation apparatus 106, and guides the received laser light to first photoreceptor 111 of light guide 101. Moreover, unlike light guide 101, sub-light guide 102 does not deliberately include leak 113. Furthermore, sub-light guide 102 is disposed along light guide 101. Here, that leak 113 is deliberately included means artificially providing leak 113 in a light guide such as disposing beads inside core 114 as in light guide 101.

In the present embodiment, like light guide 101, sub-light guide 102 is an optical fiber including core 114 and cladding 115. In addition, sub-light guide 102 includes curved portion 122 which is curved by approximately the minimum bend radius, on the opposite side of third photoreceptor 121, and the length of sub-light guide 102 including curved portion 122 is greater than that of light guide 101.

[Return 104]

In the present embodiment, light-emitting apparatus 100 includes return 104. Return 104 is disposed on the side of first photoreceptor 111 of light guide 101 and returns laser light guided by sub-light guide 102. In the present, embodiment, return 104 is a highly rigid component which maintains a curved state of curved portion 122 resulting from an end opposite third photoreceptor 121 of sub-light guide 102 being curved by approximately the minimum bend radius, and which protects curved portion 122 from pressure etc. exerted from the outside. Here, the minimum bend radius of sub-light guide 102 refers to the minimum bend radius which allows the loss of guided light caused by bending sub-tight guide 102 to be within an allowable range, and is exemplified as being approximately 10 times the diameter of sub-light guide 102. It is to be noted that the minimum bending radius depends on types or the like of components (e.g., a core and a cladding) included in sub-light guide 102.

[Detector 107]

Detector 107 is a device which detects, at a non-radiation time in which the laser diode included in radiation apparatus 106 does not radiate laser light, an electromotive force of the laser diode and informs status information about a status of a light guide, the electromotive force being based on laser light radiated by the laser diode. In the present embodiment, detector 107 is connected to one of the laser diodes included in first laser diode 161. Detector 107 detects an electromotive force of the laser diode which receives laser light which power supply 169 causes second laser diode 162 to oscillate, at a non-radiation time in which power supply 169 does not supply power to first laser diode 161. It is to be noted that although an electromotive force generated by a laser diode receiving laser light depends on a type of the laser light, one example is that an electromotive force in a range from several millivolts to several tens of millivolts is generated.

Moreover, detector 107 is capable of generating status information indicating a status of a light guide, based on a detected voltage, such as status information indicating a break in the light guide, when a voltage cannot be detected, status information indicating that the light guide is forcibly bent, when a voltage can be detected but is weak, and status information indicating no abnormality, when a detected voltage is greater than or equal to a predetermined threshold; and transmitting the generated status information to power supply 169 etc.

In the present embodiment, detector 107 is capable of detecting not only an abnormality of light guide 101 but also an abnormality of sub-light guide 102.

[Method for Checking Light-Emitting Apparatus]

Next, a method for checking a light-emitting apparatus will be described.

Figure 4:
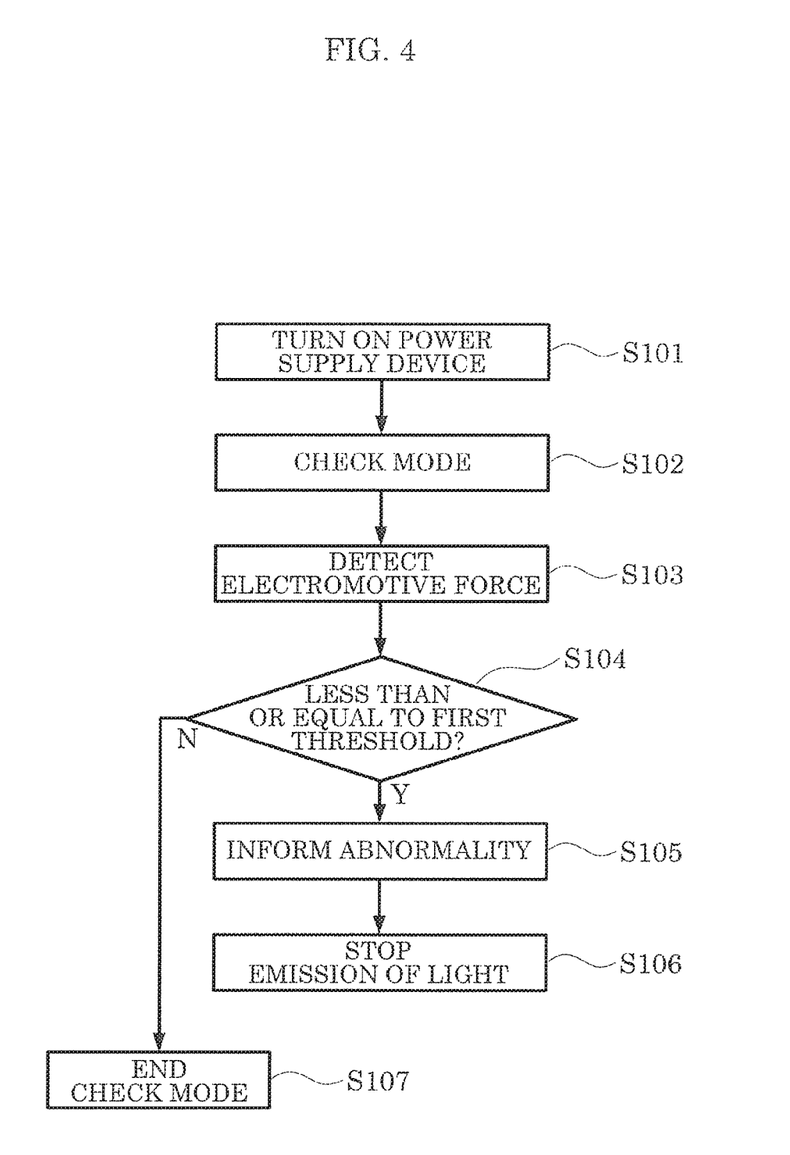
FIG. 4 is a flow chart illustrating a series of operations when the light-emitting apparatus emits light.

FIG. 4 is a flow chart illustrating a series of operations when the light-emitting apparatus emits light.

As illustrated in the figure, power supply 169 is turned on to cause light-emitting apparatus 100 to emit light at a rating by causing the laser diodes of light-emitting apparatus 100 to oscillate laser light at a rating (S101). At this stage, low output unit 164 does not cause first laser diode 161 to oscillate, causes second laser diode 162 to oscillate laser light, lower than the rated output of second laser diode 162, and starts a check mode (S102).

In the check mode, detector 107 detects the electromotive force of one of the laser diodes included in first laser diode 161 (S103). Furthermore, when determining that a detection result is less than or equal to a first threshold (S104: Y), detector 107 determines that a problem such as a break and forcible bending has occurred in light guide 101, and informs an abnormality as one type of status information (S105). It is to be noted that the reference sign "Y" in the figure etc. indicates Yes. The same applies hereinafter.

Here, an abnormality informing method is not particularly limited, but examples of the abnormality informing method include a method for informing an abnormality by causing an abnormality informing lamp provided to light-emitting apparatus 100 to emit light, and a method for informing an abnormality by transmitting abnormality information via a wire or wirelessly. Moreover, the abnormality informing method also includes transmitting status information.

Next, when detector 107 determines the presence of the abnormality, power supply 169 causes light-emitting apparatus 100 to stop the emission of light (S106).

On the other hand, when detector 107 determines that the detection result is greater than the first threshold (S104; N), low output unit 164 ends the check mode (S107). It is to be noted that the reference sign "N" in the figure etc. indicates No. The same applies hereinafter.

When the check mode is ended, light-emitting apparatus 100 emits light at the rating by causing first laser diode 161 and second laser diode 162 to oscillate at the rated output.

[Advantageous Effects]

As described above, according to the method for checking light-emitting apparatus 100 according to the present invention, because it is possible to detect a problem such as a break or forcible bending occurring in light guide 101 or sub-light guide 102 before light-emitting apparatus 100 is caused to emit light at a rating, the emission of light by light-emitting apparatus 100 can be stopped without causing any laser diode to oscillate at a rating. Accordingly, when light guide 101 is broken, it is possible to reduce the unexpected leakage of laser light, and improve safety for the human eye. In addition, an operator can recognize that forcible bending or the like has occurred in light guide 101 and sub-light guide 102, and search light guide 101 or sub-light guide 102 for a portion being forcibly bent and address the occurrence of the forcible bending or the like.

Moreover, because laser light is received from each of first photoreceptor 111 and second photoreceptor 112 and guided in an opposite direction, it is possible to reduce luminance unevenness of visible light in the extending direction of light guide 101.

Moreover, because return 104 protects curved portion 122 of sub-light guide 102 which has relatively inadequate structural strength, it is possible to improve the structural strength of whole light-emitting apparatus 100 and to dispose light-emitting apparatus 100 on a floor surface or the like to which pressure is applied from the outside.

[Abnormality Detection Method when Light-Emitting Apparatus Emits Light at Rating]

The following describes an abnormality detection method when a problem such as a break or forcible bending has occurred in light guide 101 or sub-light guide 102 while light-emitting apparatus 100 is emitting light at a rating.

Figure 5:
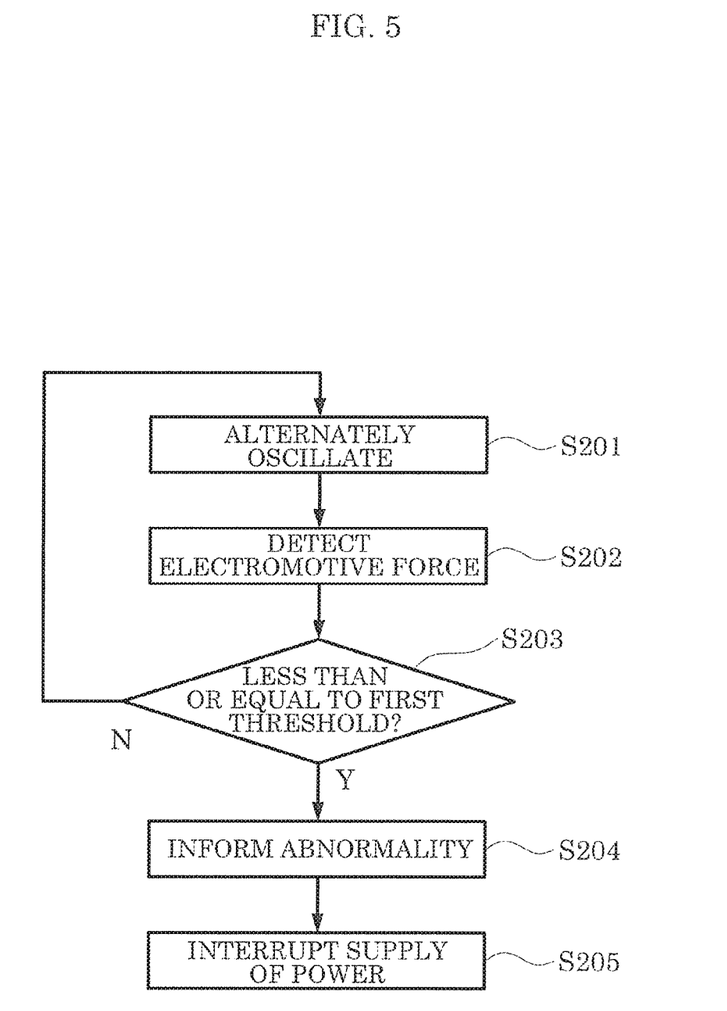
FIG. 5 is a flow chart illustrating steps of an abnormality detection method when the light-emitting apparatus emits light at a rating.

FIG. 5 is a flow chart illustrating steps of an abnormality detection method when the light-emitting apparatus emits light at a rating.

At a time of emission of light at a rating, light-emitting apparatus 100 causes converter 103 to emit light by causing first laser diode 161 and second laser diode 162 to alternately oscillate at a rated output (S201). With this, light-emitting apparatus 100 which, linearly emits light is intended to reduce luminance unevenness in an extending direction and extend the life of the laser diodes.

Detector 107 obtains from power supply 169 a timing with which power supply 169 does not supply power to first laser diode 161 and first laser diode 161 stops radiating laser light, and detects the electromotive force of one of the laser diodes based on laser light which second laser diode 162 oscillates at a rated output, until power supply 169 supplies power to first laser diode 161 (S202). Furthermore, when determining that a detection result is less than or equal to a second threshold (S203: Y), detector 207 determines that a problem such as a break and forcible bending has occurred in light guide 101, and informs an abnormality as one type of status information (S204).

Subsequently, interrupting unit 163 which has obtained from detector 107 the status information indicating the abnormality immediately interrupts the supply of power to first laser diode 161 and second laser diode 162.

[Advantageous Effects]

As described above, by detecting an abnormality in light guide 101 or the like when light-emitting apparatus 100 according to the present embodiment emits light at a rating, it is possible to detect a problem occurring in light guide 101 or sub-light guide 102 such as a sudden break, forcible bending, or the like while light-emitting apparatus is caused to emit light at a rating. Accordingly, when light guide 101 or sub-light guide 102 of light-emitting apparatus 100 emitting light is broken, it is possible to immediately stop the unexpected leakage of laser light, and ensure safety for the human eye. Moreover, an operator can recognize that forcible bending or the like has occurred in light guide 101 or sub-light guide 102, and prevent a break in light guide 101 resulting from the forcible bending.

Moreover, because sub-light guide 102 is disposed along light guide 101, it is possible to receive laser light radiated by radiation apparatus 106 only from one side of light-emitting apparatus 100. Accordingly, even when laser light is unexpectedly emitted because, for example, any portion of light guide 101 or sub-light guide 102 is broken, radiation of all beams of laser light can be stopped by causing radiation apparatus 106 to stop oscillating laser light, and it is possible to easily ensure safety for the human eye or the like.

[Others]

It is to be noted that the present invention is not limited to the aforementioned embodiment. For example, other embodiments which can be realized by combing any of the structural elements described in the present description or by excluding some of the structural elements may be embodiments of the present invention. Furthermore, variations obtainable through various modifications to the aforementioned embodiment which can be conceived by a person skilled in the art without departing from the essence of the present invention, that is, the meaning of the recitations in the claims are included in the present invention.

Figure 6:
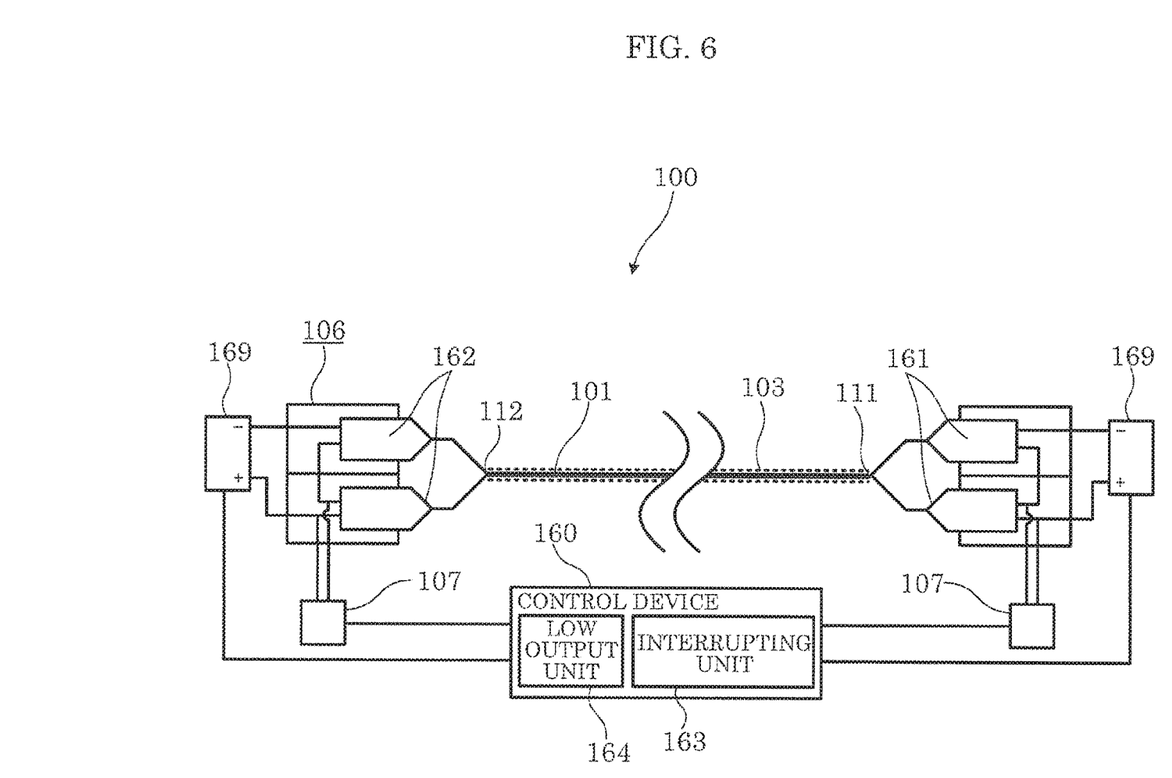
FIG. 6 is a diagram illustrating a variation of the light-emitting apparatus.

For example, as illustrated in FIG. 6, light-emitting apparatus 100 may include two radiation apparatuses 106 respectively connected to the both ends of light guide 101. In this case, light-emitting apparatus 100 may include two detectors 107 each connected to the laser diodes of a corresponding one of radiation apparatuses 106. Furthermore, light-emitting apparatus 100 may separately include controller 160 which controls interrupting unit 163 and low output unit 164, and may control power supplies 169 based on status information informed by each of detectors 107.

For example, such light-emitting apparatus 100 emits light at a rating by causing first laser diode 161 and second laser diode 162 to alternately oscillate, and detectors 107 alternately detect an electromotive force of first laser diode 161 in a non-radiation state, that is, not radiating laser light, and an electromotive force of second laser diode 162. Subsequently, when the electromotive force of one of the laser diodes becomes less than or equal to a predetermined third threshold, detectors 107 may inform an abnormality as status information, and controller 160 which has received the status information may interrupt the radiation of laser light by each of two radiation apparatuses 106.

With this, even when light guide 101 is suddenly broken while light-emitting apparatus 100 is emitting light at a rating, all laser oscillations can be stopped with high responsiveness, and it is possible to improve safety for the human eye.

Moreover, although a case has been described where laser light radiated by each of the laser diodes is received by a corresponding one of the both ends of light guide 101, laser light radiated by one laser diode may be split into two beams, and the two beams of the split light may be received respectively by the both ends of light guide 101.

Moreover, when a laser diode is caused to oscillate laser light weaker than a rated output in the check mode, the laser light may be oscillated in a predetermined pulse pattern. With this, when a light guide is normal, a defector is capable of detecting the electromotive force of the laser diode by the same pulse pattern, and distinguishing noise from a signal.

Figure 7:
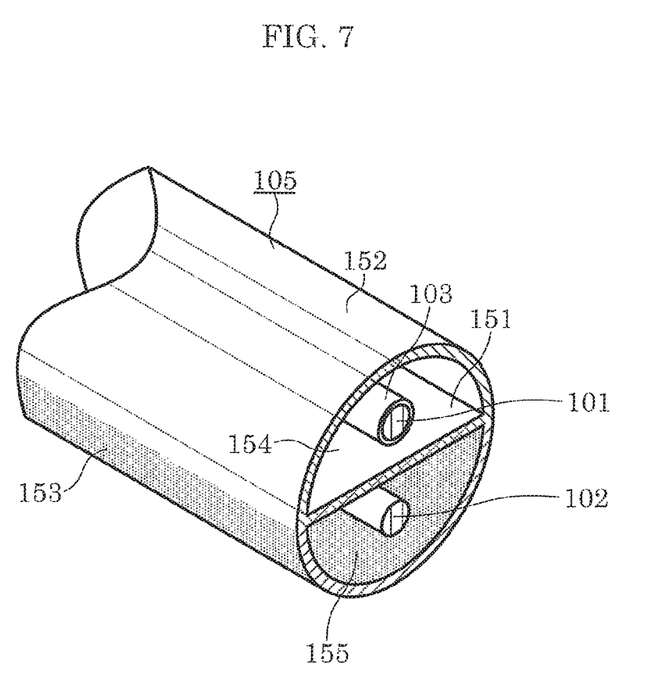
FIG. 7 is a cross-sectional perspective view illustrating a light guide inside a protector.

Moreover, as illustrated in FIG. 7, light-emitting apparatus 100 may include protector 105 which is tubular and protects light guide 101 and sub-light guide 102 that are inserted into protector 105.

Protector 105 can be easily connected to one radiation apparatus 106 by holding light guide 101 and sub-light guide 102 such that first photoreceptor 111 of light guide 101 and third photoreceptor 121 of sub-light guide 102 are disposed at the same open end. Moreover, protector 105 may include partition 151 which partitions a space inside protector 105 into first chamber 154 which houses light guide 101 and second chamber 155 which houses sub-light guide 102 and blocks light leaked out of sub-light guide 102. Furthermore, a surrounding wall of protector 105 on the side of first chamber 154 may be transmissive portion 152 which is transparent and capable of transmitting light emitted by converter 103, and a surrounding wall of protector 105 on the side of second chamber 155 may be light-blocking portion 153 which blocks light involuntarily leaked out of sub-light guide 102. In addition, partition 151 may serve to block light leaked out of sub-light guide 102 and reflect light emitted by converter 103, and may be opaque white in color.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A light-emitting apparatus, comprising:
a radiation apparatus including a first laser diode and a second laser diode;
a light guide which includes a first light-receiving portion at one end, a second light-receiving portion at another end, and a leak, the first light-receiving portion receiving laser light radiated by the first laser diode, the second light-receiving portion receiving laser light radiated by the second laser diode, the light guide guiding the laser light received by the first light-receiving portion to the second light-receiving portion, and the laser light received by the second light-receiving portion to the first light-receiving portion, the leak allowing leakage laser light to be leaked out in a direction crossing a light-guiding direction, the leakage laser light being part of the laser light;
a converter which is disposed along the light guide and converts a wavelength of the leakage laser light leaked out of the light guide; and
a detector which detects, at a non-radiation time in which the first laser diode does not radiate laser light, an electromotive force of the first laser diode and informs status information about a status of the light guide, the electromotive force being based on the laser light radiated by the second laser diode.

2. The light-emitting apparatus according to claim 1, wherein the radiation apparatus includes a low output unit which causes the second laser diode to oscillate laser light at an output lower than a rated output of the second laser diode, and
in the case where the electromotive force of the first laser diode when the second laser diode of the radiation apparatus oscillates laser light at a low output is less than or equal to a first threshold, the detector informs an abnormality as the status information.

3. The light-emitting apparatus according to claim 1, wherein in the case where the electromotive force of the first laser diode which is based on laser light which the second laser diode oscillates at a rated output is less than or equal to a second threshold, the detector informs an abnormality as the status information.

4. A method for checking a light-emitting apparatus which includes: a radiation apparatus including a laser diode; a light guide which includes a first light-receiving portion at one end, a second light-receiving portion at another end, and a leak, the light guide guiding laser light radiated by the radiation apparatus and received by the first light-receiving portion and the second light-receiving portion, the leak allowing leakage laser light to be leaked out in a direction crossing a light-guiding direction, the leakage laser light being part of the laser light; a converter which is disposed along the light guide and converts a wavelength of the leakage laser light leaked out of the light guide; and a detector which detects, at a non-radiation time in which the laser diode does not radiate laser light, an electromotive force of the laser diode and informs status information about a status of the light guide, the electromotive force being based on the laser light radiated by the laser diode, the method comprising:
oscillating laser light weaker than a rated output of the laser diode before the light-emitting apparatus emits light by causing the laser diode to oscillate laser light at the rated output; and
informing an abnormality of the light guide when the detector determines that the electromotive force of the laser diode is less than or equal to a first threshold.

5. A light-emitting apparatus, comprising:
a radiation apparatus including a laser diode;
a beam splitter that splits laser light radiated by the radiation apparatus into two beams of the laser light;
a light guide which includes a first light-receiving portion at one end, a second light-receiving portion at another end, and a leak, the light guide guiding one of the two beams of the laser light split by the beam splitter and received by the first light-receiving portion to the second light-receiving portion, and another of the two beams of the laser light split by the beam splitter and received by the second light-receiving portion to the first light-receiving portion, the leak allowing leakage laser light to be leaked out in a direction crossing a light-guiding direction, the leakage laser light being part of the laser light;
a converter which is disposed along the light guide and converts a wavelength of the leakage laser light leaked out of the light guide; and
a detector which detects, at a non-radiation time in which the laser diode does not radiate laser light, an electromotive force that is generated in the laser diode by the laser light radiated by the laser diode and returning through the light guide to the laser diode, and informs status information about a status of the light guide.

\* \* \* \* \*